//

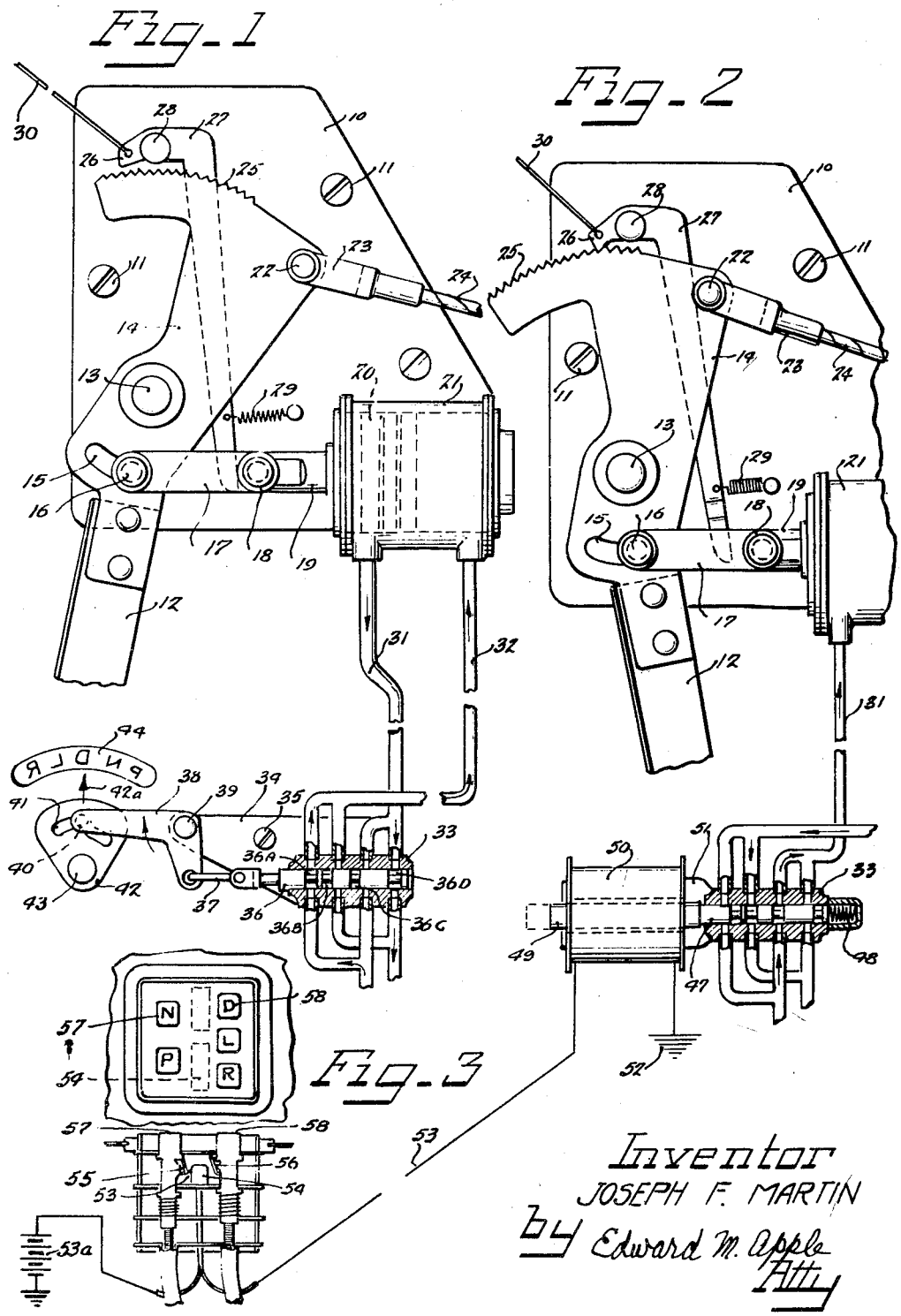

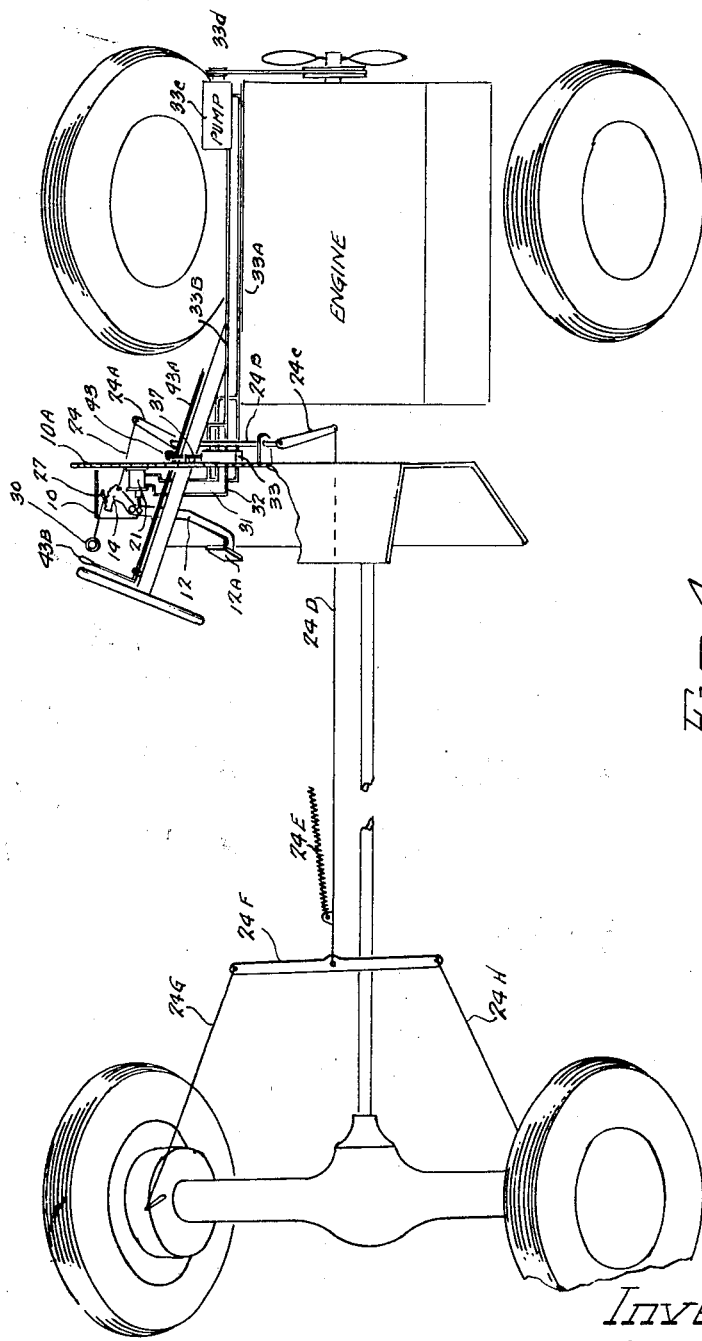

United States Patent Office 2,867,309
Patented Jan. 6, 1959

2,867,309

HYDRAULIC ACTUATOR FOR FOOT OPERATED EMERGENCY BRAKE

Joseph F. Martin, Detroit, Mich., assignor to Mabel M. Martin, Detroit, Mich., and himself as tenants by the entireties with full rights of survivorship Application December 24, 1956, Serial No. 630,405

2 Claims. (Cl. 192—4)

This invention relates to automotive vehicles and particularly to an emergency brake mechanism for the same.

An object of the invention is to provide automatic, power means, for setting and releasing the foot lever type of emergency brake of an automotive vehicle, and this application may be considered a continuation in part, of my co-pending application Serial Number 561,858, filed January 27, 1956, now Patent No. 2,821,275 dated January 28, 1958. The invention herein disclosed, also may be considered an improvement on the inventions disclosed in my issued patents, Numbers 2,725,128, 2,725,129, 2,725,130 and 2,725,131.

In the patents previously issued to me, the numbers of which are hereinabove set out, I disclosed automatic means for setting and releasing the conventional, hand, push-pull type of emergency brake mechanism. In my co-pending application Serial Number 561,858, filed January 27, 1956, and in this application, I disclose automatic power means, for setting and releasing a conventional, foot operated, lever type of emergency brake mechanism, combined with both, the steering column type of speed selector mechanism, and the so-called "push button drive" type of speed selector mechanism, used to control an automatic transmission.

In my co-pending application hereinabove referred to, I disclose specific power means, for shifting and releasing the foot lever type of emergency brake, and certain of the claims made in the said co-pending application may be considered generic to the specific means herein disclosed.

Another object of the invention is to provide an automatic, power operated, emergency brake, with means for manual control, in the event of a power failure.

Another object of the invention is to provide an automatic, power operated emergency brake, with means to permit the moving of the vehicle, if desired, when the transmission is in neutral.

Another object of the invention is to provide automatic, power means for engaging and disengaging the foot lever type of emergency brake, which means may readily be installed on old or new motor vehicles, equipped with conventional brake mechanisms and automatic transmissions.

Another object of the invention is to provide means for automatically engaging, and disengaging, the emergency brake, simultaneously with the changing of the position of the transmission speed selector mechanism.

Another object of the invention is to provide automatic, hydraulic, power means for engaging and releasing the foot lever type emergency brake mechanism, which hydraulic, power means are controlled by the manual operation of selecting a predetermined position, on the automatic transmission control mechanism, without in any way, interfering with the normal functioning of the automatic transmission.

The foregoing and other objects and advantages of the invention will become more apparent as the description proceeds. Reference being made from time to time to the accompanying drawings, forming part within disclosure, in which drawings:

Fig. 1 is an elevational view of a hydraulically operated, foot lever type of, emergency brake control, used with motor vehicles having a steering column type of transmission speed selector control. This view shows the emergency brake in "off" position.

Fig. 2 is a view similar to Fig. 1, but shows the emergency brake in "on" position. In this view, however, the hydraulic mechanism is electrically controlled, through means connected to the "push button" type of speed selector.

Fig. 3 is a diagrammatic view, with parts in section, of a "push button" type of automatic transmission speed selector control, with electrical means combined therewith, for controlling the hydraulic emergency brake actuator illustrated in Fig. 2.

Fig. 4 is a schematic view of a motor vehicle, having an emergency brake system, including a hydraulic pressure system, and a foot pedal, combined with the mechanism shown in Fig. 1.

Referring now more particularly to the drawings, it will be understood that in the embodiment herein disclosed, the reference character 10 indicates a mounting plate, which is secured by means of screws 11, to the body 10A of a motor vehicle, equipped with a foot lever operated emergency brake, and an automatic transmission, and provided with one or the other of the speed selector mechanisms, such as disclosed in Fig. 1 and in Figs. 2 and 3.

The mounting plate 10 is positioned, in conventional manner, on the driver's side of the vehicle for convenient manipulation by the driver, of the foot lever 12, which is pivoted, as at 13, to the mounting plate 10. The foot lever 12 consists of a length of heavy metal, preferably of T shaped cross-section, to which is secured, by any suitable means, a bearing plate 14 and a foot piece 12A Fig. 4. The bearing plate 14 has formed therein a slot 15, in which is adapted to ride a pivot pin 16, which supports one end of a pair of links 17, the opposite ends of which connect, as at 18, to the end of the piston rod 19, which in turn is secured to a double acting piston 20, which is mounted for reciprocation in the hydarulic cylinder 21. The slot 15, in the plate 14, is shaped and positioned so that the lever 12 may be manually operated by the foot of the vehicle driver, in the event of a power failure, or the like.

The bearing plate 14 is pivoted, as at 22, to a clevis 23, which in turn is connected to the cable 24, which in turn connects through linkage 24A, 24B, and 24C to the emergency brake cable 24D which in conventional practice is spring loaded, as at 24E. The cable 24D moves the linkage 24F, 24G, and 24H to actuate the brakes. The bearing plate 14 is provided with a series of ratchet teeth along its upper edge, as at 25, which teeth are adapted to be engaged by the locking pawl 26, formed on one end of the locking arm 27, which is pivoted, as at 28, to the mounting plate 10. The lower end of the arm 27 is spring loaded, as at 29, so that the arm 27 is normally urged into locking position by means of the spring 29. The arm 27 is moved out of locking position by means of the pivot pin 18 and the piston rod 19, as the linkage 17 is moved to the left as shown in Fig. 1. The arm 27 may also be moved out of locking position by means of the hand pull 30, in the event of a power failure.

The hydraulic cylinder 21 is connected, through the pipes 31 and 32, to and through a hydraulic valve mechanism 33 and the pipes 33A and 33B, to a source of hydraulic power including a pump 33C, which is driven by the vehicle engine, as at 33D. The hydraulic valve mechanism 33 is mounted on a bracket 34, which in turn is secured by screws 35, or other suitable means, to a permanent part of the motor vehicle. The valve 33 is provided with a plunger 36, which is connected by linkage 37, to a bell crank 38, which is pivoted, as at 39, on the bracket 34. The bell crank 38 is provided with a cam 40, which rides in a cam slot 41 formed in a cam plate 42, which is mounted, as at 43, on the shift rod, or the speed selector rod 43A, of the automatic transmission control mechanism, which is shifted by the handle 43B (Fig. 4), the various selective positions of which are indicated on the dial 44, which comprises part of the automatic transmission speed selector mechanism illustrated in Fig. 1. The plunger 36 is provided with passage ways 36A, 36B, 36C and 36D, so that the flow of hydraulic fluid through the valve 33, may be alternately moved in either direction, whereby to direct the hydraulic pressure to either side of the piston 20, to effect the setting and releasing of the emergency brake.

The device functions as follows:

The shape of the cam slot 41 is such that when the shift rod 43 is moved in either direction, between drive (D), low (L) and reverse (R) positions, no movement takes place in the bell crank 38, consequently there is no movement in the valve plunger 36, and the oil in the hydraulic system will pass through the pipes 31 and 32, and the valve 33, in the direction indicated by the arrows. This places hydraulic pressure on the right side of the piston 20 (Fig. 1), causing the piston to move to the left, and causing the arm 27 to be moved into unlocked position, thereby permitting the bearing plate 25 and the foot lever 12 to be moved to the brake "off" position, under the influence of the spring loaded brake cable 24 and 24D.

When the shift rod 43 is moved, so that the pointer 42a on the cam plate 42 moves to neutral (N), or park (P), the cam slot 41 will cause the bell crank 38 to move in the direction indicated by the arrow on the bell crank 38, which in turn will pull the plunger 36 to the left, reversing the flow of the fluid through the hydraulic system, and causing the piston 20 to move to the right from the position shown in Fig. 1, and causing the piston rod 19 and the linkage 17, to move the lever 12 and bearing plate 14 into the position shown in Fig. 2, in which position the lower end of the locking arm 27 will be free of the pivot pin 18, and will be pulled into locking position under the influence of the spring 29.

In Fig. 2, the plunger 47 of the hydraulic valve mechanism 33, is spring backed, as at 48, and is secured to the armature core 49, of a solenoid 50, which is secured, as at 51, to the valve housing 33. The solenoid 50 is grounded, as at 52, and is electrically connected, as at 53, to the contact member of a switch 54, which in turn is connected, as at 53a, to the storage battery, or into the electrical system of the vehicle. The switch member 54 is adapted to be contacted by either members 55 or 56, to close and open the circuit through the solenoid 50, when the push buttons 57 or 58 are pushed, as is more fully described in my said co-pending application, otherwise the device functions as previously described.

Having described my invention, what I claim and desire to secure by Letters Patent is:

1. In a motor vehicle, having an emergency brake mechanism, including a foot lever for actuating the emergency brake pull cable, and a speed selector mechanism, the combination of a member secured to one end of said foot lever and moveable therewith, means connecting said member to said cable, a hydraulic cylinder comprising part of a hydraulic pressure system, a double acting piston in said cylinder, means connecting said piston to said member, a hydraulic valve for controlling said pressure system interposed in the hydraulic system between said cylinder and a source of hydraulic pressure, and means connected to said speed selector and said valve whereby the shifting from one position to another of said speed selector mechanism actuates said valve, said member having ratchet teeth formed on one edge, a locking pawl pivoted near said member and positioned to engage and disengage said teeth, an extension on said pawl in contacting relation with means attached to said piston, whereby to move said pawl in one direction upon the movement of said piston, and means for moving said pawl in the opposite direction.

2. In a motor vehicle, having an emergency brake mechanism, including a foot lever for actuating the emergency brake pull cable, and a speed selector mechanism, the combination of a member secured to one end of said foot lever and moveable therewith, means connecting said member to said cable, a hydraulic cylinder comprising part of a hydraulic pressure system, a double acting piston in said cylinder, means connecting said piston to said member, a hydraulic system between said cylinder and a source of hydraulic pressure, and means connected to said speed selector and said valve whereby the shifting from one position to another of said speed selector mechanism actuates said valve, the said valve shifting means comprising a solenoid having its armature connected to said valve, whereby to cause movement of said valve, said solenoid being electrically connected to the electrical system of the vehicle, and electrical circuit make and brake means in said electrical system, positioned to be actuated by the movement of the conventional push buttons, which comprises part of the said speed selector mechanism.

References Cited in the file of this patent

UNITED STATES PATENTS

| | | |
|---|---|---|
| 1,909,377 | Neven | May 16, 1933 |
| 2,247,714 | Peterson et al. | July 1, 1941 |
| 2,631,700 | Long et al. | Mar. 17, 1953 |
| 2,725,129 | Martin | Nov. 29, 1955 |